United States Patent
Skiba et al.

(10) Patent No.: US 8,921,010 B2
(45) Date of Patent: *Dec. 30, 2014

(54) METHOD OF PREPARING A FUEL CELL UNITIZED ELECTRODE ASSEMBLY BY ULTRASONIC WELDING

(71) Applicant: Ballard Power Systems Inc., Burnaby (CA)

(72) Inventors: Tommy Skiba, East Hartford, CT (US); Chi-Hum Paik, Brownstown Township, MI (US); Thomas D. Jarvi, Manchester, CT (US)

(73) Assignee: Ballard Power Systems Inc., Burnaby (CA)

(*) Notice: Subject to any disclaimer, the term of this patent is extended or adjusted under 35 U.S.C. 154(b) by 0 days.

This patent is subject to a terminal disclaimer.

(21) Appl. No.: 14/028,397

(22) Filed: Sep. 16, 2013

(65) Prior Publication Data

US 2014/0014254 A1 Jan. 16, 2014

Related U.S. Application Data

(62) Division of application No. 12/087,036, filed on Jun. 24, 2008, now Pat. No. 8,568,943.

(51) Int. Cl.
*H01M 8/10* (2006.01)
*H01M 8/02* (2006.01)
*B29C 65/72* (2006.01)

(52) U.S. Cl.
CPC ............ *B29C 65/72* (2013.01); *Y02E 60/521* (2013.01); *H01M 8/1004* (2013.01); *H01M 8/0286* (2013.01); *H01M 8/0284* (2013.01); *H01M 8/0297* (2013.01)
USPC ........................................ 429/535; 156/73.1

(58) Field of Classification Search
USPC .......................................... 429/535; 156/73.1
See application file for complete search history.

(56) References Cited

U.S. PATENT DOCUMENTS

| | | | |
|---|---|---|---|
| 5,733,678 A | 3/1998 | Ledjeff et al. | |
| 6,159,628 A | 12/2000 | Grasso et al. | |
| 8,568,943 B2 * | 10/2013 | Skiba et al. | 429/535 |
| 2003/0091885 A1 * | 5/2003 | Kobayashi et al. | 429/32 |
| 2003/0203273 A1 * | 10/2003 | Puttaiah et al. | 429/38 |
| 2005/0252603 A1 * | 11/2005 | Rule | 156/245 |

FOREIGN PATENT DOCUMENTS

| | | |
|---|---|---|
| JP | H0845517 A | 2/1996 |
| JP | H1145729 A | 2/1999 |

(Continued)

*Primary Examiner* — Patrick Ryan
*Assistant Examiner* — Frank Chernow
(74) *Attorney, Agent, or Firm* — Seed IP Law Group PLLC

(57) ABSTRACT

A unitized electrode assembly (9) for use in the fuel cell comprises a first GDL (23), a PEM (28), and a second GDL (12), with electrode catalysts (27, 30) disposed between said PEM and each of said GDLs, said layers (23, 27, 30, 12) being impregnated with a thermoplastic polymer a sufficient distance from each edge of the UEA so as to form a fluid seal (13). The UEA is formed by a process which comprises making a sandwich of some or all of said layers (23, 27, 28, 30 and 33), with thermoplastic polymer film (22, 25, 32, 35) extending inwardly from the edges of said sandwich a sufficient distance to form the seal, said thermoplastic polymer film being disposed between each electrode and the adjacent GDL and/or between each GDL and release film (21, 36) on the top and bottom of the sandwich. The sandwich, compressed by force between a holding fixture (19) and an anvil (40), is heated by ultrasonic vibration so as to cause said thermoplastic polymer to melt and impregnate the layers (23, 27, 30, 12) of the UEA with the film (22 and/or 25; 32 and/or 35).

6 Claims, 3 Drawing Sheets

(56) References Cited

FOREIGN PATENT DOCUMENTS

| | | |
|---|---|---|
| JP | H11204122 A | 7/1999 |
| JP | 2001118592 A | 4/2001 |
| JP | 2002050400 A | 2/2002 |
| JP | 2004311303 A | 11/2004 |
| JP | 2005032546 A | 2/2005 |
| JP | 2005158690 A | 6/2005 |
| WO | 2004086543 A2 | 10/2004 |
| WO | 2005035247 A2 | 4/2005 |
| WO | 2005117165 A1 | 12/2005 |

* cited by examiner

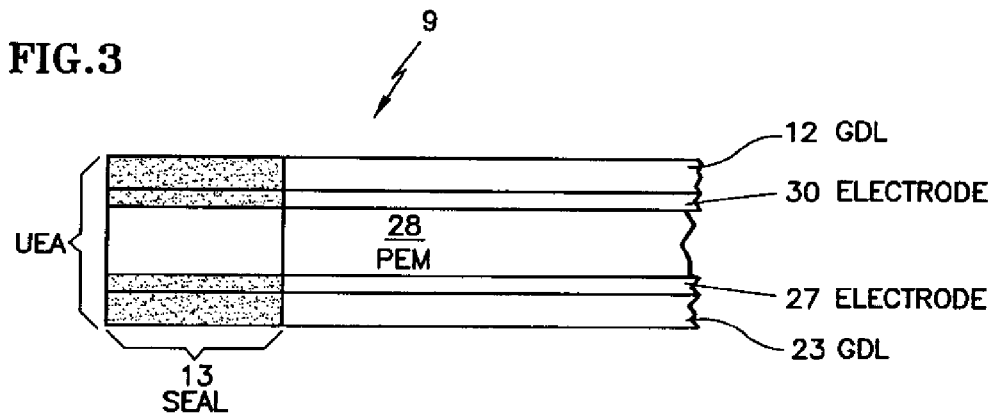
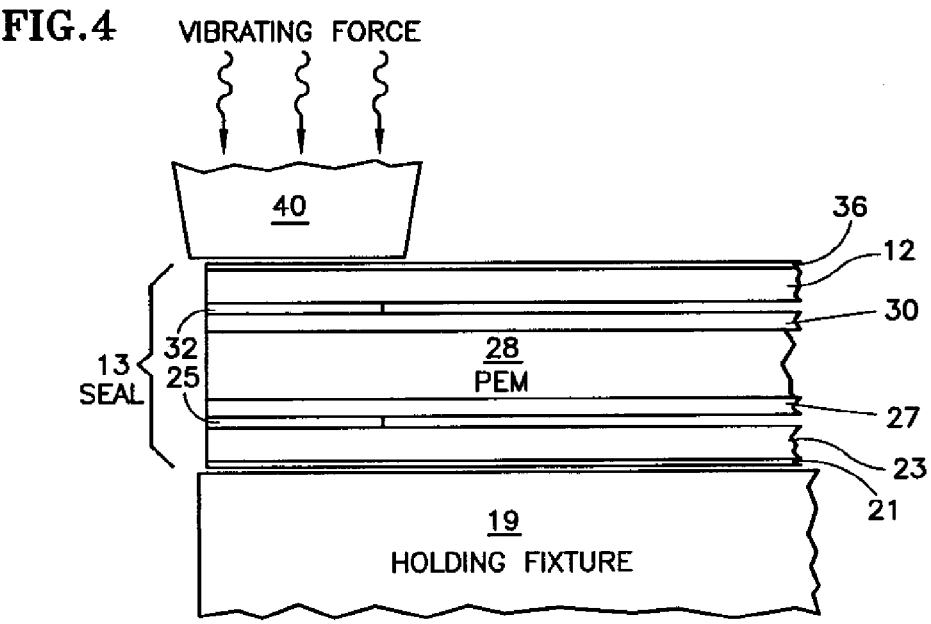

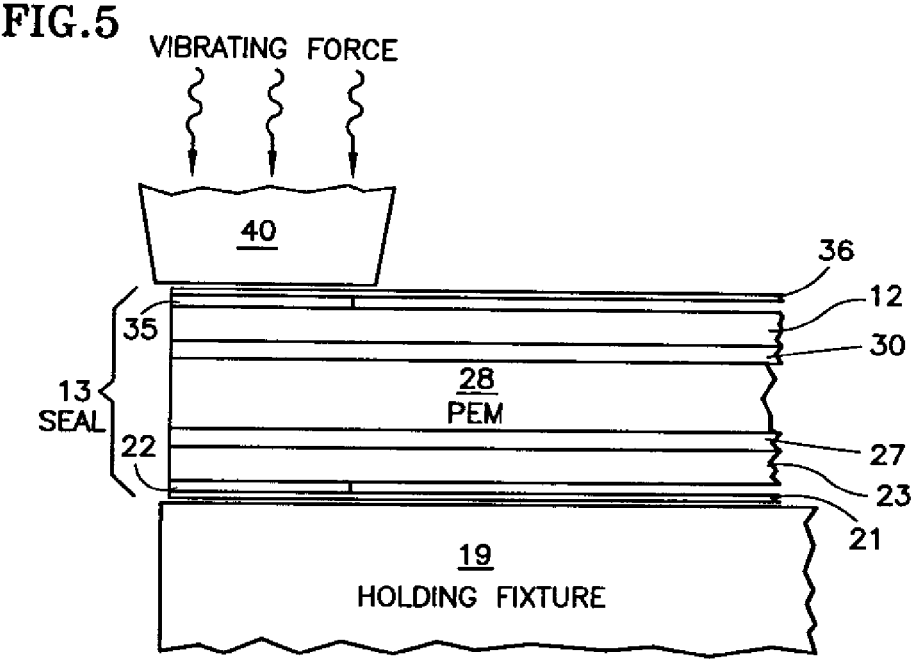
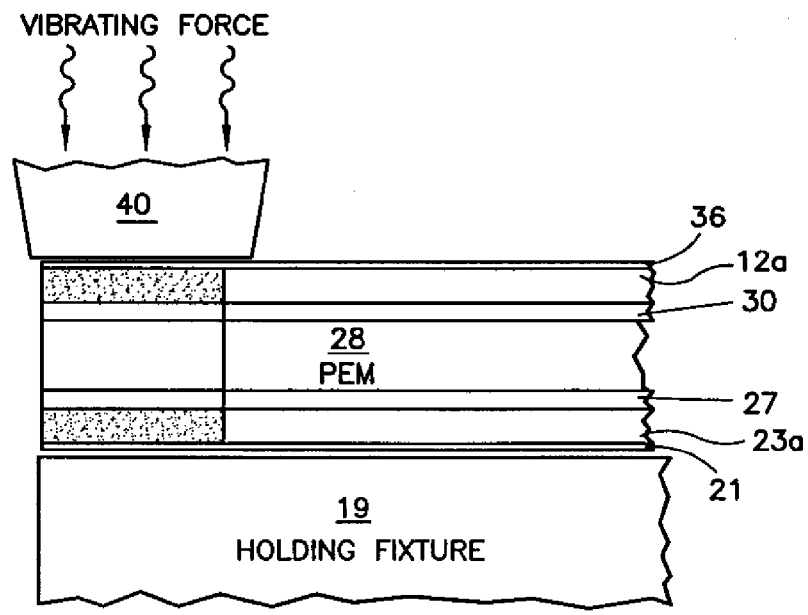

METHOD OF PREPARING A FUEL CELL UNITIZED ELECTRODE ASSEMBLY BY ULTRASONIC WELDING

CROSS REFERENCE TO RELATED APPLICATION

This application is a division of U.S. application Ser. No. 12/087,036 filed Jun. 24, 2008.

TECHNICAL FIELD

This invention relates to a unitized electrode assembly (UEA) for a fuel cell which is produced by utilizing a film of thermoplastic polymer, such as polyethylene, polypropylene, or other easily melted high flowing plastic, layered around the cathode and anode gas diffusion layers (GDLs). Ultrasonic welding, such as vertical vibrational pressure, is utilized to heat the edge areas of the UEA planform, causing the plastic to diffuse through the GDLs and the electrode catalysts, thereby forming a solid plastic edge serving as a fluid seal of the UEA.

BACKGROUND ART

Fuel cell power plants that employ a polymer, proton exchange membrane electrolyte (PEM) include a cathode electrode on one side of the PEM and an anode electrode on the other side of the PEM, the electrodes comprising suitable catalysts so as to convert hydrogen and oxygen reactant gases into electricity and water, all as is known. The reactants reach the membrane by means of reactant gas flow field plates, sometimes referred to as water transport plates, and thence gas diffusion layers (GDLs), occasionally referred to as substrates. The GDLs are adjacent to respective sides of the electrodes. The membrane may typically be a fluorinated polymer, such as that sold under the name NAFION®. The electrodes are typically a mixture of polymer and noble metal, as is known.

A recent innovation is to manufacture a unitized electrode assembly (UEA), including the anode and cathode GDLs and electrodes, on respective sides of the membrane, unitized and sealed into a single structure, using thermoplastics. Thermoplastics only undergo a change of state (liquefy) when at a high temperature and return to a solid state when cooled, and can be re-melted and reformed. This is in contrast with thermoset plastics, which, when formed, undergo an irreversible chemical change, and cannot be reformed with heat.

Techniques for joining thermoplastics use localized heating of the thermoplastics to be joined causing melting, followed by resolidification at the interface.

In "frictional welding", moving one part against the other generates heat at the interface causing one or both parts to melt. Once melting begins, the parts are held together until the thermoplastics solidify to each other. This method may also be known as "linear vibration welding", "orbital vibration welding", or "spin welding".

"Laser or IR" welding directs a beam of laser or IR through a transparent thermoplastic causing surface heating of an opaque thermoplastic at the interface of the two thermoplastics. When the interface reaches a sufficient temperature, the plastics begin to melt and bond together by interflow.

"Radio Frequency" welding, also called "High Frequency" welding relies on the dissipation of some of the energy of a changing electromagnetic field in an imperfect dielectric to heat the plastic; subsequent cooling causes two plastics to be joined together.

In "Hot Plate" welding methods, one or both of the plastic pieces to be joined is/are held against a hot plate until softening begins. The plastic is removed from the hot plate and placed against the mating surface and held until cooled.

The welding methods described are not useful in the manufacture of MEAs because they only effect the joining of two thermoplastic surfaces together at their interface.

"Ultrasonic welding" is defined as employing mechanical oscillations between 16 kHz and 1 GHz. Typical ultrasonic welding machines operate in the 15 kHz to 70 kHz range and most commonly around 20 kHz. A generator produces electrical oscillations at the desired frequency, which are then transferred to a converter in which crystals expand and contract creating mechanical vibrations at the same frequency. These vibrations are transferred to a horn that contacts the stack of plastic parts to be welded. As the horn moves vertically up and down, perpendicular to the plane of the parts, heat friction develops along the joining area between the two plastic parts that melts the plastic and joins the parts.

Not all thermoplastics respond the same to ultrasonic welding. Those that have an amorphous polymer structure, characterized by random arrangement of molecules, will have a broader softening and melting point and transfer ultrasonic vibrations well. Examples of such thermoplastics are polystyrene, polyetherimide and low density polyethylene. Thermoplastic polymers of a semi-crystalline nature have more ordered structure and well-defined melting points and do not transfer ultrasonic vibrations as well and are therefore harder to weld. Examples of such thermoplastics are polyester, polyethylene, and linear low density polyethylene (LLDPE). In general, high melting point and low melt index polymers are more difficult to weld.

A "press plate" method for manufacturing a UEA involves laying out a complete UEA with polyethylene films between the various layers and on the exterior of the GDLs. Then, press plates apply pressure to the assembly as the press plates are heated to on the order of 150° C. (320° F.). Thereafter, the press plates must be cooled before pressure is released and the sealed UEA removed from the press plates. This process typically takes at least ten and as much as sixty minutes per UEA manufactured. The process is costly and consumes manufacturing floor space. In addition, the process is inefficient in that it requires heating of the entire planform in addition to the press plates. It is known that elevated temperature causes degradation of the PEM, and thus the durability of the UEA is reduced as a consequence of heating of the entire planform of the UEA during manufacture.

Another method utilizing injection molding or compression molding of a thermoplastic polymer is disclosed in patent application PCT/US03/01796, International Publication No. WO03/063280 A2. This process may require pretreating such as corona treatment, oxygen plasma treatment or fluoropolymer dispersions. There are additional problems of the fountain-flow thermoplastics readjusting the positioning of components, and the like. These and other problems require additional processing techniques in order to cause successful manufacture of UEAs.

DISCLOSURE OF INVENTION

Objects of the invention include: a method of manufacturing a fuel cell UEA which heats only the outside edge of the UEA which is to be sealed; providing a UEA without subjecting the PEM to elevated temperatures; providing manufacture of a UEA in short cycle times; avoiding the necessity of heating and cooling press plates, as well as the entire UEA, in the manufacture of a UEA; manufacturing UEAs for fuel cells with a single, exclusive method; and improved fuel cell UEAs.

This invention is predicated on the discovery that thermoplastic polymers, such as polyethylene, when heated by vibrational energy, will impregnate carbon fiber of gas diffusion layers and diffuse into the porous catalyst/polymer electrode layers adjacent to the PEMs, thereby forming a solid plastic seal of the entire permeable edge volume of a UEA.

According to a first form of the present invention, an easily melted, free-flowing thermoplastic polymer film, such as polyethylene film, is placed outside of the GDLs and/or between each GDL and the related electrode along the edges of the periphery of a laid-up UEA sandwich, a suitable non-melting release film being placed on the upper and lower surfaces of the UEA sandwich; the thermoplastic polymer film is melted by vibrational energy applied only to the edges of the UEA sandwich, that is, adjacent to the plastic film; the vibrating energy melts the film and pressure applied at the same time causes the thermoplastic polymer to impregnate the GDLs, and diffuse into the adjacent porous catalyst layers, forming a mechanical bond therewith.

In accordance with the invention in another form, the edges of the GDLs are impregnated with a thermoplastic and then laid up in a sandwich adjacent to the electrodes, with the PEM between the electrodes and release film on the upper and lower surfaces. The vibrational energy is applied with compression to form the UEA, as in the first form of the invention described hereinbefore, using the thermoplastic preformed into the GDLs.

In one form of the invention, the UEA is formed one edge at a time by an ultrasonic welder having a straight vibrating anvil; in another form, the invention may be practiced utilizing an ultrasonic welder having a frame-shaped vibrating anvil. Other combinations of edges may also be welded using this invention.

The invention avoids subjecting the active area of the UEA to elevated temperature which might reduce the durability of the polymer exchange membrane.

The melting, impregnating, diffusion and cooling to make a UEA according to the invention requires only on the order of five seconds. The invention permits cycle times on the order of one-half minute to several minutes, and uses less energy than prior art assembly methods.

The invention may be used to make unitized assemblies for electrochemical cells other than fuel cells, such as electrolyzers.

Other objects, features and advantages of the present invention will become more apparent in the light of the following detailed description of exemplary embodiments thereof, as illustrated in the accompanying drawings.

BRIEF DESCRIPTION OF THE DRAWINGS

FIG. 3 is a partial, sectioned side elevation view, with sectioning lines omitted for clarity, of the section of FIG. 2 when the UEA is completed.

FIG. 4 is a partial, sectioned side elevation view, with sectioning lines omitted for clarity, of a first alternative to the method of FIGS. 2 and 3.

FIG. 5 is a partial, sectioned side elevation view, with sectioning lines omitted for clarity, of a second alternative to the method of FIGS. 2 and 3.

FIG. 6 is a partial, sectioned side elevation view, with sectioning lines omitted for clarity, of a second form of the invention.

MODE(S) FOR CARRYING OUT THE INVENTION

Figure 1:
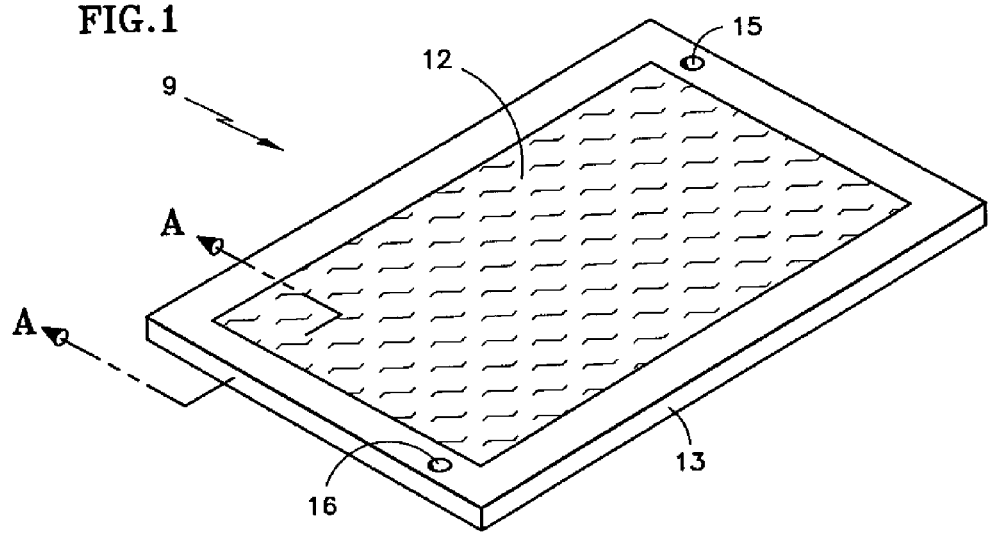
FIG. 1 is a perspective view of a unitized electrode assembly made in accordance with the process of the present invention.
Figure 2:
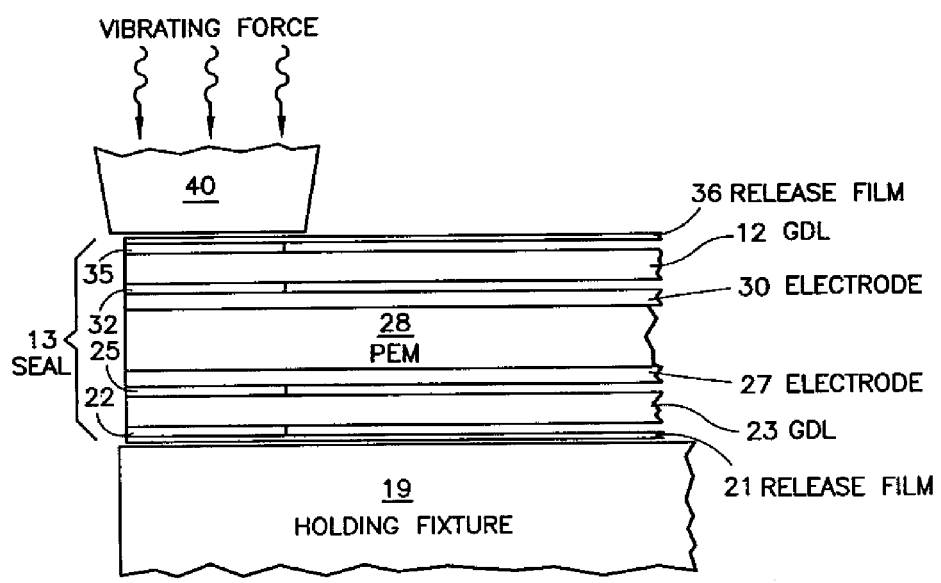
FIG. 2 is a partial, sectioned side elevation view, with sectioning lines omitted for clarity, taken on the line A-A in FIG. 1, before unitization.

Referring to FIGS. 1 and 2, a unitized electrode assembly 9 made in accordance with the process of the present invention includes a reactant gas flow distribution layer herein referred to as a gas diffusion layer (GDL) 12, and an integrated seal 13; holes 15, 16 register the various layers during the process of forming the seal 13. The seal 13 extends around the edge of the entire periphery of the unitized electrode assembly 9. In a typical case, the unitized electrode assembly might be on the order of 8 cm by 14 cm, and the seal may be formed to have a width of 2 cm-3 cm when formed, and then the UEA may be trimmed so that the seal width is on the order of 8 mm-10 mm.

The process comprises laying up the various components as illustrated in FIG. 2, above a holding fixture, which has pins to receive the registering holes 15, 16. There is first laid down a release film 21 which may be TEFLON®, KAPTON®, or any other high temperature plastic film which will not melt or stick to the polyethylene, including a film of high temperature polyethylene. Then there is a first layer 22 of thermoplastic polymer film, which may extend a variety of distances from the edge sufficient to form a fluid edge seal; in this embodiment the film 22 may extend on the order of two or three centimeters in from the edge of the UEA assembly. A GDL 23, such as an anode GDL, is positioned above the film 22. A second layer 25 of thermoplastic polymer film is positioned above the GDL 23. An electrode, such as an anode electrode 27, which comprises a conventional fuel cell catalyst, is disposed above the second layer 25 of film. The PEM 28 is disposed above the electrode 27. Another electrode, such as a cathode electrode 30, is positioned above the PEM 28. A third layer 32 of thermoplastic polymer film is positioned above the electrode 30. A second GDL 12, such as a cathode GDL, is disposed above the third layer of film 32. A fourth layer 35 of thermoplastic polymer film is positioned above the second GDL 12. A release film 36 is positioned at the top of the stack of components.

The holding fixture 19 is part of an ultrasonic welding machine which has an anvil 40 that provides a vertical force as the distance between the fixture 19 and the anvil 40 is varied ultrasonically, by on the order of 2 micrometers to 10 micrometers. An available system for serving this purpose is the Branson 2000 IW Ultrasonic Welding System. The clamping force may be on the order of 500 kPa (60 psig). The vibration may, for instance, be on the order of 20 kHz. The anvil may be straight, so that each edge of the UEA is sealed separately, or have a picture frame shape so that four edges of a UEA may be sealed in a single plunge. Other combinations of edge sealing may also be used.

After the force has been applied, with vibration, for about one-half second, the polyethylene film becomes completely diffused through the various layers to form an integrated seal 13, completely impregnated throughout, as is illustrated by stippling in FIG. 3.

Instead of thermoplastic sheets (22, 25; 32, 35) placed on both sides of each GDL, thermoplastic sheets 25, 32 may be placed only between each GDL 23, 12 and the adjacent electrode 27, 30, as shown in FIG. 4. Under pressure and vibration for a suitable time, the melted plastic will impregnate the edge of each GDL from the inside out and diffuse into the electrodes to provide the seal described with respect to FIG. 3 hereinbefore.

Alternatively, the thermoplastic sheets 22, 35 may be placed outside of the GDLs 23, 12, as shown in FIG. 5. The melted plastic will impregnate each GDL from the outside in.

In another form of the invention, shown in FIG. 6, GDL's 12a, 23a are impregnated with thermoplastic polymer, as shown by the stippling, and thereafter laid up in a sandwich with the release film 21, the anode electrode 27, the PEM 28, the cathode electrode 30, and the release film 36. Then the vibrating force is applied by the ultrasonic welding machine 19, 40.

The thermoplastic polymer may comprise polyethylene, polypropylene or other suitable polymers.

The invention claimed is:

1. A method of preparing a fuel cell unitized electrode assembly having a plurality of edges, which method comprises:

forming a multi-layer sandwich comprising a first gas diffusion layer having upper and lower surfaces extending throughout the entire electrode assembly, a first electrode catalyst extending throughout the entire electrode assembly, either (a) a first thermoplastic polymer film disposed on said upper surface of said first gas diffusion layer, or (b) a second thermoplastic polymer film disposed on said lower surface of said first gas diffusion layer, or (c) both said first and second thermoplastic polymer films, a proton exchange membrane electrolyte extending throughout the entire electrode assembly and having a first surface adjacent to said first electrode catalyst, a second electrode catalyst extending throughout the entire electrode assembly and adjacent to a second surface of said proton exchange membrane electrolyte, a second gas diffusion layer extending throughout the entire electrode assembly, having upper and lower surfaces, and either (d) a third thermoplastic polymer film disposed on said upper surface of said second gas diffusion layer, or (e) a fourth thermoplastic polymer film disposed on said lower surface of said second gas diffusion layer, or (f) both said third and fourth thermoplastic polymer films, said thermoplastic polymer films extending inwardly from said edges a distance to provide a fluid edge-seal about the periphery of said unitized electrode assembly; and bonding said sandwich together in only a single step comprising applying a clamping force and ultrasonic vibrational energy to said sandwich to cause said thermoplastic polymer films to impregnate and bond said gas diffusion layers and said electrode catalysts.

2. A method according to claim 1 wherein:
said bonding step is performed (a) on one edge at a time or (b) on more than one edge at a time.

3. A method according to claim 1 further comprising:
said sandwich being disposed between release films prior to applying said clamping force and ultrasonic vibrational energy.

4. A method of preparing a fuel cell unitized electrode assembly having a plurality of edges, which method comprises:

forming a multi-layer sandwich comprising a first release film, a first gas diffusion layer extending throughout the entire electrode assembly, a first electrode catalyst extending throughout the entire electrode assembly, either (a) a first thermoplastic polymer film disposed between said first release film and said first gas diffusion layer, or (b) a second thermoplastic polymer film disposed between said first gas diffusion layer and said first electrode catalyst, or (c) both said first and second thermoplastic polymer films, a proton exchange membrane electrolyte extending throughout the entire electrode assembly and having a first surface adjacent to said first electrode catalyst, a second electrode catalyst extending throughout the entire electrode assembly adjacent to a second surface of said proton exchange membrane electrolyte, a second gas diffusion layer extending throughout the entire electrode assembly, a second release film, and either (d) a third thermoplastic polymer film disposed between said second electrode catalyst and said second gas diffusion layer, or (e) a fourth thermoplastic polymer film disposed between said second gas diffusion layer and said second release film, or (f) both said third and fourth thermoplastic polymer films, said thermoplastic polymer films extending inwardly from said edges to provide a fluid edge-seal about the periphery of said unitized electrode assembly; and bonding said sandwich together in only a single step comprising applying a clamping force and ultrasonic vibrational energy to said sandwich to cause said thermoplastic polymer films to impregnate and bond said gas diffusion layers and said electrode catalysts.

5. A method according to claim 4 wherein:
said bonding step further comprises heating said thermoplastic polymer films with vibrational energy sufficient to cause said thermoplastic polymer films to bond said electrode catalyst layers with said gas diffusion layers.

6. A method according to claim 4 wherein:
said bonding step is performed (a) on one edge at a time or (b) on more than one edge at a time.

* * * * *